United States Patent Office 2,859,052
Patented Nov. 4, 1958

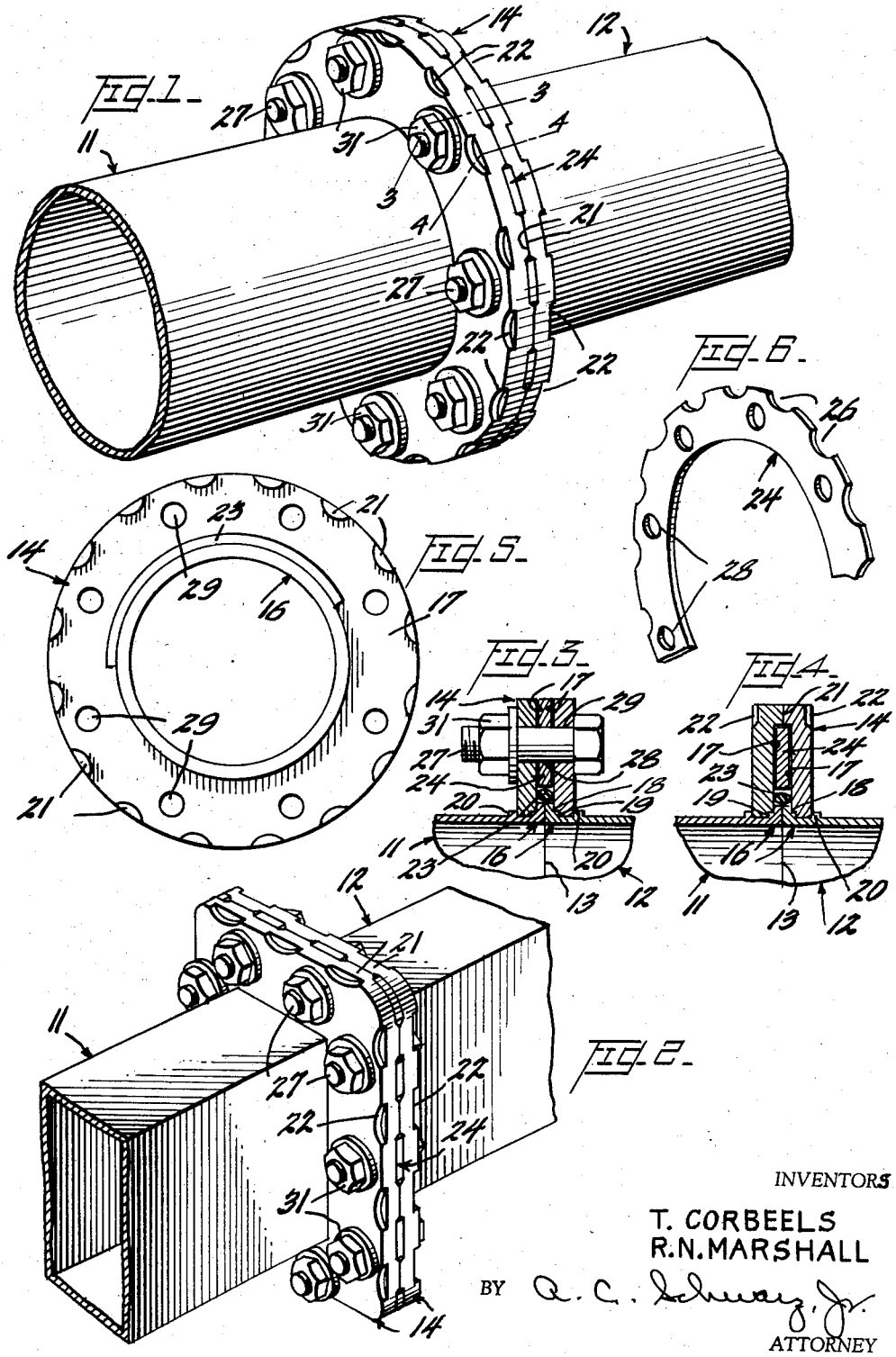

2,859,052

COUPLING WITH FLANGE ALIGNING MEANS

Theophile Corbeels and Robert N. Marshall, Winston-Salem, N. C., assignors to Western Electric Company, Incorporated, New York, N. Y., a corporation of New York Application November 17, 1954, Serial No. 469,488

1 Claim. (Cl. 285—18)

The present invention relates to a rigid flange coupling for tubular members that are adapted to abut against each other end to end, and more particularly to a flange coupling for joining sections of wave guides.

The use of wave guides for transmission in microwave systems having a plurality of frequency bands of wide range is possible if the dimensions, alignment and/or concentricity of the wave guides are held to very close tolerances. Since the wave guide line may be filled with a suitable gas such as dry air or nitrogen to protect the interior from corrosion, it is necessary to have a sealed joint and for electrical reasons the joint must mate nearly perfectly all around the inner perimeter of the tubing. This presents a problem of forming a suitable coupling at the joint which will be gas tight and will provide as smooth and continuous mating of its inner walls as possible, plus the required stability to withstand conditions to which subjected in unprotected installations throughout the world. The joints in wave guides are necessary to connect long sections of wave guides in the construction of a network of transmission towers or lines which may extend across a continent, to replace defective sections, and to insert at the proper locations auxiliary equipment necessary for effective and efficient transmission or control.

It is, therefore, an object of this invention to provide a coupling for tubular members which will have the desired physical and electrical characteristics necessary for the simultaneous transmission of a plurality of microwave bands of wide range.

It is a further object of the invention to provide a flange coupling which will provide a gas tight juncture between two tubular members.

It is a still further object of the invention to provide a flange coupling which will rigidly secure two tubular members together.

It is another object of the invention to provide a flange coupling which will rigidly secure two tubular members together, not loosen under vibration and temperature changes, and not warp or move under strain.

According to the present invention the tubular members may be held together end to end by the use of flanges mounted on abutted end portions of the tubular members. Each rigid tubular coupling may comprise a pair of tubular members adapted to be placed in end to end engagement, a flange secured on each tube near the abutted end thereof and having a plurality of spaced bosses near the outer periphery of the flange extending outwardly from the faces thereof and terminating in the same plane as the contacting surface of the abutted tubular members, a resilient gasket between the flanges held around the abutted portions of the tubes by a wafer-like annulus of slightly less thickness than the distance between the faces of the flanges measured at a point where no bosses occur and aligned by a plurality of peripheral notches engaging the bosses, and a means for securing the flanges to each other.

Other objects and features of the invention will be more readily understood from the following detailed description when read in conjunction with the accompanying drawings, in which:

Fig. 1 shows a flange coupling on a pair of circular tubular members;

Fig. 2 shows a flange coupling on a pair of rectangular tubular members;

Fig. 3 shows a cross-sectional view of a flanged tubular joint at a section where no bosses appear, taken substantially on the line 3—3 of Fig. 1;

Fig. 4 shows a cross-sectional view of a flanged tubular joint at a section where bosses abut each other, taken substantially on the line 4—4 of Fig. 1;

Fig. 5 shows an end view of a flanged circular tubular member and a portion of a resilient gasket in place; and Fig. 6 shows a portion of the wafer-like annulus.

Referring now to the drawings wherein like reference numerals indicate similar elements throughout the several views, a pair of similar tubular members, designated generally by the numerals 11 and 12, which may be circular (Fig. 1), rectangular (Fig. 2) or any suitable shape, are adapted to engage each other end to end to form a mechanical and electrical joint 13 (Figs. 3 and 4). A flange, designated generally by numeral 14, is secured on each of the tubes 11 and 12 near the engaging end by an abutting or contacting head portion, designated generally by the numeral 16, adjacent a face 17 of the flange 14. The head portion 16 may be of any suitable configuration but is preferably formed of a collar having steps 18 and 19 which will create shearing surfaces to strengthen the coupling, since it has been found during longitudinal pulling tests that stepped surfaces withstand greater pulling pressures without distorting the tube out of tolerance before the tubing breaks. Once the coupling, as shown in Figs. 1 and 2, is assembled by securing the two flanges 14 together, no additional means is necessary to retain the flanges 14 in position on the tubular members 11 and 12. In fact, the joint would be as effective if the flanges 14 were slidably mounted and unsecured on the tubes 11 and 12, assuming they abutted the head portion 16. However, in the process of assembling the coupling, there is a danger that the flanges 14 might be knocked loose and slip away from the head portions 16 of the tubes 11 and 12, and, therefore, for convenience it is desirable to further secure the flanges 14 in place on the tube 11 and 12 by a suitable step or collar 20 thereon and adjacent the back of the flange 14.

The flange 14, having an inside perimeter of the desired size and shape of the outside perimeter of the head portion 16 of the tubular members 11 and 12 over which it is placed has an equalizing land which may be of any suitable shape but which is shown as a plurality of spaced semicircular bosses 21 near the outer periphery thereof extending outwardly from the face 17 of the flange 14 and terminating in the same plane as the contacting surface of the head portion 16 of the abutted tubular members 11 and 12. The indentations 22 formed on the back of the flange 14 are formed as a result of a punch press operation in forming the bosses 21 on the face 17 of the flange 14.

A resilient gasket 23 is placed around the joint 13 in the cavity formed by the land bosses 21 and the contacting head portions 16. To insure that the gasket remains in place to provide a gaslight seal and to restrict outward movement of the gasket toward the periphery, a wafer-like annulus, designated generally by the numeral 24, is placed between the flanges 14 and in cooperation therewith. The annulus 24 has a plurality of peripheral semicircular notches 26 engaging the plurality of bosses 21 on the flanges 14 to hold the annulus 24 in proper alignment, to ensure proper abutment of mating surfaces of bosses 21, and to facilitate placement of bolts 27 through apertures 28 in the annulus 24 and apertures 29 in the flanges 14 during assemblage. The annulus 24 is of a slightly less thickness than the distance between the faces 17 of the flanges 14 measured at a point where no bosses occur thus eliminating the possibility of the annulus 24 binding between the flanges 14 when the flanges 14 are secured together with corresponding bosses 21 abutting each other. Therefore when the flanges 14 are tightened by means of the bolts 27 and nuts 31, maximum possible pressure is exerted between the inner contacting head portions 16 to make a nearly perfectly mated joint 13 to conduct electricity and in cooperation with the resilient gasket 23 to effect a tightly sealed joint 13 in order to retain the gas in the tubes 11 and 12 thereby protecting the interior of the tubes 11 and 12 from corrosion. Further, the use of sealed gastight joints will give added protection if high voltages are utilized.

It should be noted that if the flange 14 is loose on the tube, and there is no collar 20 or positive seal, the gasket 23 must engage the joint 13 under pressure and effect a seal at that point. However, if the flange 14 is secured on the tube in such a manner that collar 20 or some other positive seal is present the gasket 23 may fit loosely around the joint 13, the seal being effected between the faces 17 of the flanges 14.

Although it has been stated that like reference numerals indicate similar elements throughout the several views, for reasons of clarity in the description like numerals have been used to designate similar elements having either a circular configuration as shown in Figs. 1, 5 and 6 or a rectangular configuration as shown in Fig. 2. However, it is obvious that the views as shown in Figs. 3 and 4 where the cross-sections were taken from a section where no bosses appear and where the bosses 21 abut each other respectively, would remain unchanged regardless of whether such cross-sections were taken from the circular coupling as shown in Fig. 1 or the rectangular coupling as shown in Fig. 2.

It is to be understood that the above-described embodiments are simply illustrative of the application of the principles of the invention. Numerous other arrangements may be readily devised by those skilled in the art which will embody the principles of the invention and fall within the spirit and scope thereof.

What is claimed is:

A tubular wave guide coupling comprising a pair of tubular wave guide sections positioned in end to end engagement, a flange secured to each of the sections near the engaging end thereof, each of the flanges having a plurality of spaced bosses near the periphery thereof, said bosses on one flange being in abutting contact with matching bosses on the other flange such that opposed identical pairs of bosses are abutted when the flanges are in assembled predetermined axial alignment, each of the flanges having a plurality of spaced apertures intermediate the bosses and the engaging ends of the wave guide sections, said bosses extending from the face of each flange and terminating in the same plane as the engaging ends of the wave guide sections, the bosses and engaging ends of the wave guide sections and the faces of the flanges defining an annular space when the pairs of bosses of the flanges are positioned in aligned abutting relationship and the ends of the sections are in engagement, a resilient gasket ring located within the annular space and surroundingly sealing the engaging ends of wave guide sections, the gasket ring being of a slightly greater normal thickness than the axial width of the annular space, an annulus positioned within the annular space and surroundingly confining the gasket ring, the annulus being of a thickness slightly less than the axial width of the annular space and having a plurality of apertures therethrough and a plurality of notches, each notch being complementary to and in engagement with opposed identical pairs of bosses, the notches locating each annulus aperture in alignment with each corresponding aligned aperture in each flange and locating opposed identical pairs of bosses in aligned engagement, and fastening means projecting through the aligned apertures in the flanges and annulus to secure the flanges to each other.

References Cited in the file of this patent

UNITED STATES PATENTS

| | | |
|---|---|---|
| 672,034 | Cunningham | Apr. 16, 1901 |
| 826,154 | Doolittle | July 17, 1906 |
| 1,703,018 | Stiennon | Feb. 19, 1929 |
| 1,876,415 | Heard | Sept. 6, 1932 |
| 2,127,578 | Wyman | Aug. 23, 1938 |
| 2,202,492 | Jacocks | May 28, 1940 |
| 2,384,386 | Malmberg | Sept. 4, 1945 |
| 2,465,719 | Fernsler | Mar. 29, 1949 |
| 2,529,381 | Frear | Nov. 7, 1950 |
| 2,596,839 | Clausen | May 13, 1952 |
| 2,606,967 | Collard et al. | Aug. 12, 1952 |

FOREIGN PATENTS

| | | |
|---|---|---|
| 12,886 | Great Britain | Sept. 27, 1884 |
| 3,568 | Great Britain | Feb. 19, 1895 |
| 3,034 | Great Britain | Mar. 16, 1901 |
| 485,308 | France | Oct. 8, 1917 |